United States Patent
Westover

(10) Patent No.: US 11,040,683 B2
(45) Date of Patent: Jun. 22, 2021

(54) SHORT RANGE COMMUNICATION FOR VEHICULAR USE

(71) Applicant: TOYOTA MOTOR ENGINEERING & MANUFACTURING NORTH AMERICA, INC., Plano, TX (US)

(72) Inventor: Nathan C. Westover, New Hudson, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 224 days.

(21) Appl. No.: 16/108,859

(22) Filed: Aug. 22, 2018

(65) Prior Publication Data
US 2020/0062203 A1 Feb. 27, 2020

(51) Int. Cl.
*B60R 21/0136* (2006.01)
*G08G 1/01* (2006.01)
*H04W 4/80* (2018.01)
*G07C 5/00* (2006.01)
*G07C 5/08* (2006.01)
*B60R 21/00* (2006.01)

(52) U.S. Cl.
CPC .......... *B60R 21/0136* (2013.01); *G07C 5/008* (2013.01); *G07C 5/085* (2013.01); *G08G 1/0116* (2013.01); *H04W 4/80* (2018.02); *B60R 2021/0006* (2013.01); *B60R 2021/0025* (2013.01)

(58) Field of Classification Search
CPC ........ B60R 21/0136; B60R 2021/0006; B60R 2021/0025; H04W 4/80; G07C 5/008; G07C 5/085; G08G 1/0116
See application file for complete search history.

(56) References Cited

U.S. PATENT DOCUMENTS 9,147,353 B1* 9/2015 Slusar .................. G08G 1/0129
9,728,087 B2 8/2017 Davis et al.
2005/0278098 A1* 12/2005 Breed ................... G01S 13/931
701/45

(Continued)

FOREIGN PATENT DOCUMENTS

DE 102013214569 A1 1/2015
KR 1020130031997 A 4/2013

(Continued)

*Primary Examiner* — Behrang Badii
*Assistant Examiner* — Daniel L Greene
(74) *Attorney, Agent, or Firm* — Haynes and Boone, LLP

(57) ABSTRACT

Apparatus, systems, and methods generally including detecting, using a sensor, an impact at a vehicle; before, during, or after detecting the impact, storing a first data set associated with the vehicle in a first memory; in response to detecting the impact, retrieving the first data set from the first memory; transmitting, using a first short range communication device, the first data set via a first wireless signal; receiving, using a second short range communication device, the first data set via the first wireless signal; and storing the first data set in a second memory; and after storing the first data set in the second memory, retrieving the first data set from the second memory; wherein the first short range communication device is part of the vehicle; and wherein the second short range communication device is part of an infrastructure.

20 Claims, 11 Drawing Sheets

(56) References Cited

U.S. PATENT DOCUMENTS

| | | | | |
|---|---|---|---|---|
| 2007/0109111 A1* | 5/2007 | Breed | | G08G 1/166 340/435 |
| 2007/0167147 A1* | 7/2007 | Krasner | | G08G 1/205 455/404.2 |
| 2007/0174467 A1* | 7/2007 | Ballou, Jr. | | H04L 67/04 709/227 |
| 2011/0112969 A1* | 5/2011 | Zaid | | G06Q 10/02 705/50 |
| 2012/0330849 A1* | 12/2012 | Nielsen | | G06Q 10/06 705/301 |
| 2014/0020914 A1* | 1/2014 | Vilas Blanco | | A62C 37/50 169/23 |
| 2014/0200760 A1* | 7/2014 | Kaufmann | | G07C 5/008 701/29.3 |
| 2015/0012152 A1* | 1/2015 | Ricci | | G06F 3/017 701/2 |
| 2015/0039397 A1* | 2/2015 | Fuchs | | G07C 5/008 705/7.35 |
| 2015/0048045 A1 | 2/2015 | Santora | | |
| 2015/0127570 A1* | 5/2015 | Doughty | | G06Q 10/00 705/325 |
| 2016/0322078 A1* | 11/2016 | Bose | | A63F 13/217 |
| 2017/0178513 A1* | 6/2017 | Davis | | B60W 40/10 |
| 2018/0061146 A1 | 3/2018 | Bode et al. | | |

FOREIGN PATENT DOCUMENTS

| | | |
|---|---|---|
| KR | 1020130051691 A | 5/2013 |
| KR | 1020150019287 A | 2/2015 |
| KR | 1020160047240 A | 5/2016 |
| KR | 101701698 B1 | 2/2017 |
| KR | 1020180008361 A | 1/2018 |
| WO | WO 2015/009221 A1 | 1/2015 |
| WO | WO 2017/013685 A1 | 1/2017 |

* cited by examiner

SHORT RANGE COMMUNICATION FOR VEHICULAR USE

BACKGROUND

The present disclosure relates generally to short range communication and, more particularly, to short range communication for vehicular use.

SUMMARY

The present disclosure provides methods and systems for exchanging information between vehicles and infrastructure after an impact has occurred. A generalized method includes detecting, using a sensor, an impact at a vehicle. Before, during or after the impact has been detected, a first data set associated with the vehicle is stored in a first memory. In response to detecting the impact, the first data set is retrieved from the first memory and transmitted via a first wireless signal by a first short range communication device of the vehicle. The wireless signal embodying the first data set is received using a second short range communication device of an infrastructure (e.g., fire hydrant) and stored in a second memory. After the first data set is stored, the first data set is retrieved from the second memory.

A generalized system of the present disclosure provides a vehicle equipped with a first short range communication device. The vehicle includes a sensor adapted to detect an impact at the vehicle and a first memory on which a first data set associated with the vehicle is stored. The system also includes an infrastructure (e.g., fire hydrant) equipped with a second short range communication device and a second memory. In response to the sensor detecting the impact, the first data set is adapted to be retrieved from the first memory, transmitted via a first wireless signal using the first short range communication device, received via the first wireless signal using the second short range communication device, and stored on the second memory. Thereafter, the first data set may be retrieved from the second memory.

DETAILED DESCRIPTION

Figure 1A:
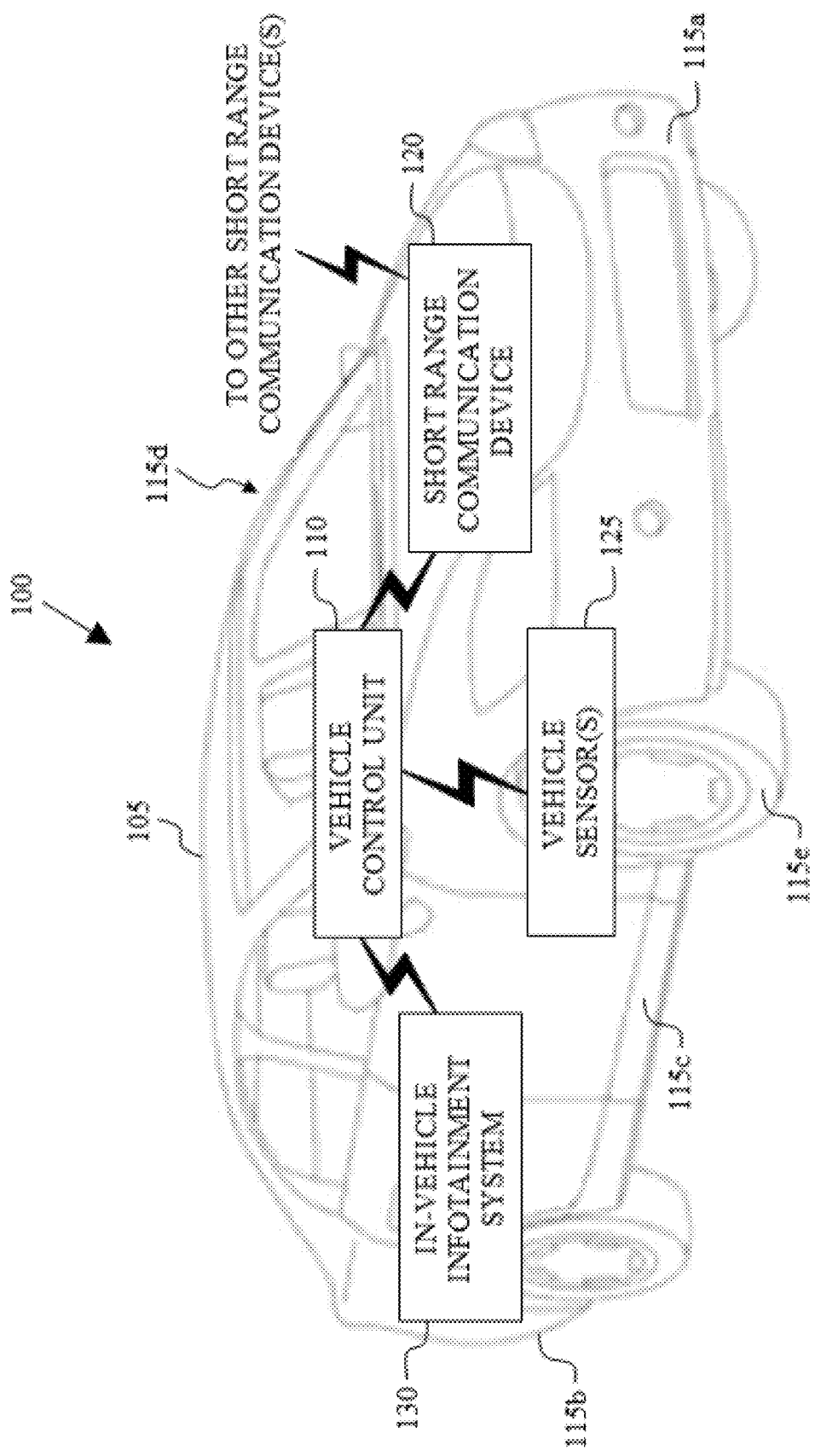
FIG. 1A is a diagrammatic illustration of a system according to one or more embodiments of the present disclosure.

FIG. 1A is a diagrammatic illustration of an apparatus according to one or more embodiments of the present disclosure. In at least one such embodiment, as illustrated in FIG. 1A, the apparatus is generally referred to by the reference numeral 100 and includes a vehicle 105, such as an automobile, and a control unit 110 located on the vehicle 105. The vehicle 105 may include a front bumper 115a, a rear bumper 115b, a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A short range communication device 120 is operably coupled to, and adapted to be in communication with, the control unit 110. A vehicle sensor 125 is also operably coupled to, and adapted to be in communication with, the control unit 110. In addition to, or instead of, being operably coupled to the control unit 110, the vehicle sensor 125 may be operably coupled to, and adapted to be in communication with, the short range communication device 120. In response to a signal (or a combination of signals) generated by the vehicle sensor 125, the short range communication device 120 is adapted to wirelessly transmit a signal to another short range communication device in the vicinity, as will be described in further detail below. An in-vehicle infotainment system 130 is operably coupled to, and adapted to be in communication with, the control unit 110. In several embodiments, one, or any combination, of the control unit 110, the short range communication device 120, the vehicle sensor 125, or the in-vehicle infotainment system 130 may be coupled to, and adapted to be in communication with, another of said components via wired or wireless communication (e.g., via an in-vehicle network).

The short range communication device 120 may be, include, or be part of a variety of short range communication devices, as will be described in further detail below; thus, as used herein the reference numeral 120 (without the suffixes (') or (")) may refer to one, or a combination, of short range communication devices 120', and 120". Likewise, the vehicle sensor 125 may be, include, or be part of a plurality of vehicle sensors, as will be described in further detail below; thus, as used herein the reference numeral 125 (without the suffixes a, b, c, d, e, f, g, h, or i) may refer to one, or a combination, of vehicle sensors 125a-i.

Figure 1B:
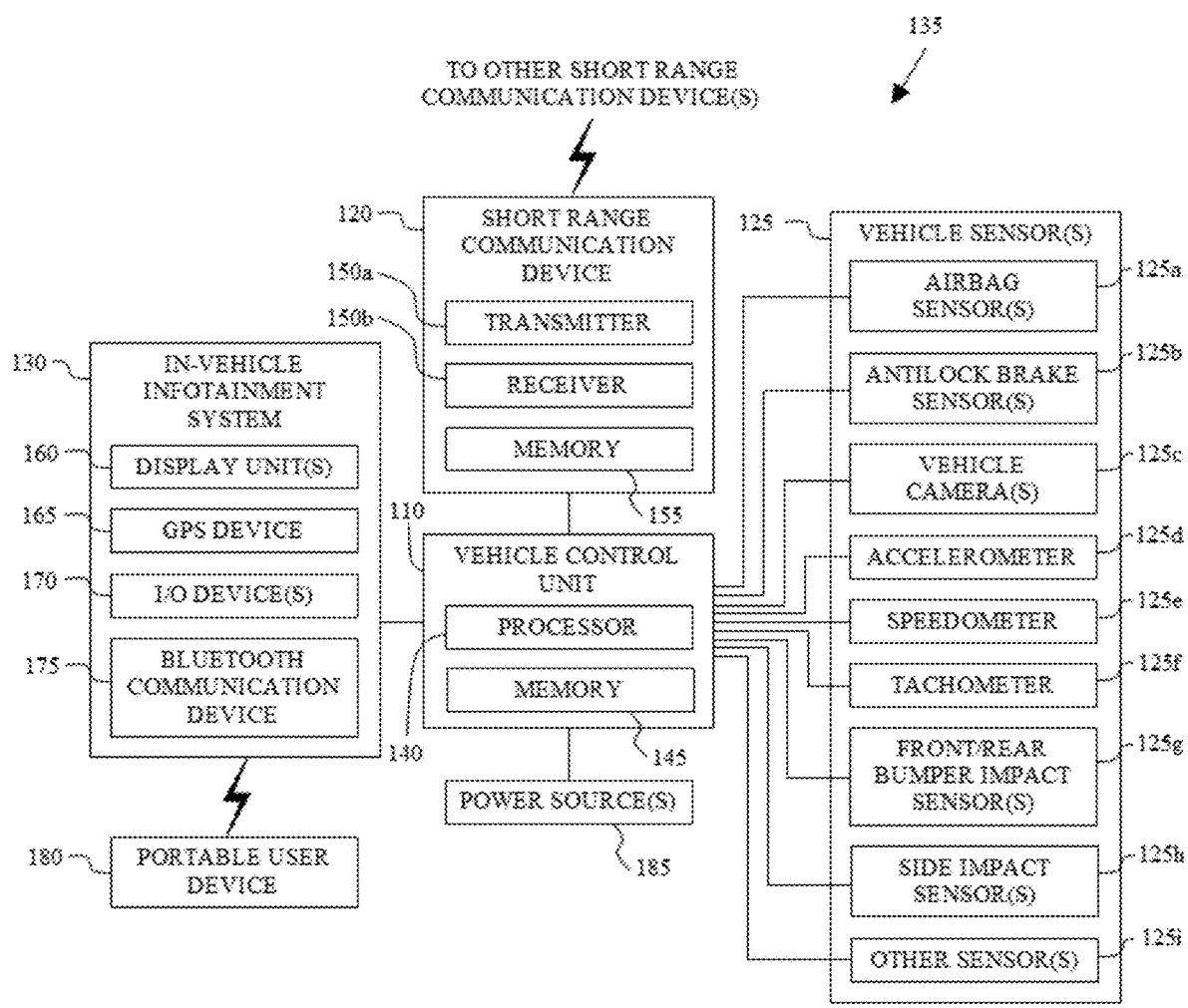
FIG. 1B is a diagrammatic illustration of a system according to one or more embodiments of the present disclosure.

FIG. 1B is a diagrammatic illustration of an apparatus according to one or more embodiments of the present disclosure. In at least one such embodiment, as illustrated in FIG. 1B, the apparatus is generally referred to by the reference numeral 135 and includes the components of the apparatus 100, which components are given the same reference numerals. Although not shown in FIG. 1B, the apparatus 135 also includes the vehicle 105, in which the other components of the apparatus 135 may be located either permanently or temporarily. In the embodiment shown in FIG. 1B, the control unit 110 includes a processor 140 and a memory 145. The short range communication device 120, which is coupled to, and adapted to be in communication with, the control unit 110, includes a transmitter antenna 150a, a receiver antenna 150b, and a memory 155. In several embodiments, one or the other of the transmitter antenna 150a and the receiver antenna 150b may be omitted according to the particular application for which the short range communication device 120 is to be used. In several embodiments, the transmitter antenna 150a and the receiver antenna 150b are combined into a transceiver antenna capable of both sending and receiving wireless signals. In an embodiment, the short range communication device 120 is NFC-enabled. In several embodiments, the short range communication device 120 is adapted to communicate via near field communication (NFC), radio-frequency identification (RFID), Bluetooth, infrared, proximity inference via, for example, global positioning system (GPS) or triangulation, other indirect technologies, and/or any combination thereof.

The in-vehicle infotainment system 130, which is coupled to, and adapted to be in communication with, the control unit 110, includes a display unit 160, a GPS device 165, an I/O device 170, and a Bluetooth communication device 175. The I/O device 170 may be in the form of a communication port (e.g., a USB port), a touch-screen display unit, soft keys associated with a dashboard, a steering wheel, or another component of the vehicle 105, and/or similar components. The display unit 160 may be, include, or be part of a plurality of display units, for example, in several embodiments, the display unit 160 may include one, or any combination, of a central display unit associated with the dashboard of the vehicle 105, an instrument cluster display unit associated with an instrument cluster of the vehicle 105, and a heads-up display unit associated with the dashboard and a windshield of the vehicle 105; thus, as used herein the reference numeral 160 may refer to one, or a combination, of said display units. In several embodiments, a portable user device 180 of a vehicle 105 occupant may be coupled to, and adapted to be in communication with, the in-vehicle infotainment system 130. In one such embodiment, the portable user device 180 is coupled to, and adapted to be in communication with, the in-vehicle infotainment system 130 via the Bluetooth communication device 175. In another such embodiment, the portable user device 180 is coupled to, and adapted to be in communication with, the in-vehicle infotainment system 130 via the I/O device 170 (e.g., via the communication port). Alternatively, the Bluetooth communication device 175 may be replaced with another short range communication device to which the portable user device 180 is coupleable.

In an embodiment, the portable user device 180 is a handheld or otherwise portable device which is carried onto the vehicle 105 by a user who is a driver or a passenger on the vehicle 105. In an additional embodiment, the portable user device 180 may be removably connectable to the vehicle 105, such as by temporarily attaching the portable user device 180 to the dashboard, a center console, a seatback, or another surface in the vehicle 105. In a further embodiment, the portable user device 180 may be permanently installed in the vehicle 105. In an embodiment, the portable user device 180 may be, include, or be part of one or more computing devices such as personal computers, personal digital assistants, cellular devices, mobile telephones, wireless devices, handheld devices, laptops, audio devices, tablet computers, game consoles, cameras, and/or any other suitable devices. In several embodiments, the portable user device 180 is a smartphone such as, for example, an iPhone® by Apple Inc.

The vehicle sensor 125, which is coupled to, and adapted to be in communication with, the control unit 110, may include one, or any combination, of an airbag sensor 125a, an antilock brake sensor 125b, a vehicle camera 125c, an accelerometer 125d, a speedometer 125e, a tachometer 125f, front/rear bumper impact sensors 125g, side impact sensors 125h, and other sensors 125i. The airbag sensor 125a may be associated with an airbag of the vehicle 105 and is adapted to generate a signal in response to deployment of the airbag. The antilock brake sensor 125b may be associated with an antilock brake system of the vehicle 105 and is adapted to generate a signal in response to engagement of the antilock brake system.

The vehicle camera 125c may be, include, or be part of a plurality of vehicle cameras, for example, in several embodiments, the vehicle camera 125c may include one, or any combination, of a front camera associated with a front portion of the vehicle 105 (e.g. the front bumper 115a), a rear camera associated with a rear portion of the vehicle 105 (e.g., the rear bumper 115b), a side camera associated with the right side portion 115c of the vehicle 105, and a side camera associated with a left side portion 115d of the vehicle 105; thus, as used herein the reference numeral 125 may refer to one, or a combination, of said vehicle cameras.

The accelerometer 125d detects the acceleration of the vehicle 105 in operation. The accelerometer 125d may be a two-axis accelerometer or a three-axis accelerometer. In several embodiments, the accelerometer 125d may be associated with an airbag of the vehicle 105 to trigger deployment of the airbag. The speedometer 125e detects the speed of the vehicle 105 in operation. In several embodiments the speedometer 125e may be associated with a display unit such as, for example, the display unit 160 of the in-vehicle infotainment system 130, to provide a visual indication of vehicle speed to a driver of the vehicle 105. The tachometer 125f detects the working speed (e.g., in revolutions per minute) of an engine of the vehicle 105. In several embodiments the tachometer 125f may be associated with the a display unit such as, for example, the display unit 160 of the in-vehicle infotainment system 130, to provide a visual indication of engine working speed to the driver of the vehicle 105.

The front/rear bumper impact sensors 125g and the side impact sensors 125h detect instances of sudden impact and severe vibration to the vehicle 105. One or more of the front/rear bumper impact sensors 125g may be incorporated into the front bumper 115a of the vehicle 105, and one or more of the front/rear bumper impact sensors 125g may be incorporated into the rear bumper 115b of the vehicle 105. Likewise, one or more of the side impact sensors 125h may be incorporated into the right side portion 115c of the vehicle 105, and one or more of the side impact sensors 125h may be incorporated into the left side portion 115d of the vehicle 105.

A power source 185 is coupled to the control unit 110 to provide electrical power thereto. The power source 185 may also provide electrical power to the short range communication device 120, the in-vehicle infotainment system 130, the vehicle sensor 125, or any combination thereof, via the coupling of these components to the control unit 110. In addition to, or instead of, being coupled to the control unit 110 to provide electrical power thereto, the electrical power source 185 may be coupled to the short range communication device 120, the in-vehicle infotainment system 130, the vehicle sensor 125, or any combination thereof, to provide electrical power thereto.

Figure 2A:
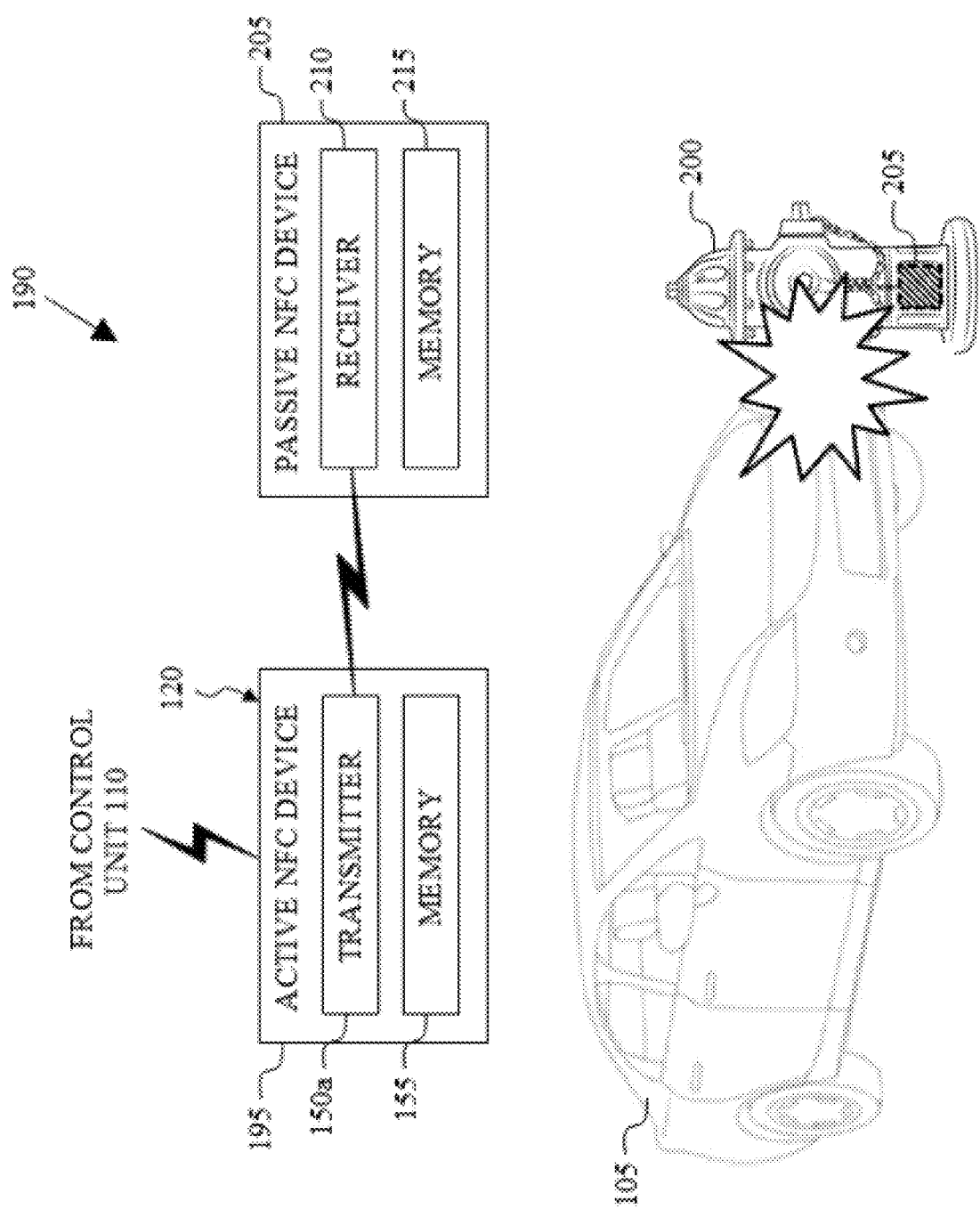
FIG. 2A is a diagrammatic illustration of a system in operation according to one or more embodiments of the present disclosure.

FIG. 2A is a diagrammatic illustration of a system in operation according to one or more embodiments of the present disclosure. In one such embodiment, as illustrated in FIG. 2A, the system is generally referred to by the reference numeral 190 and includes the components of the apparatus 100 and the apparatus 135, which components are given the same reference numerals. In the embodiment shown in FIG. 2A, the short range communication device 120 of the vehicle 105 is an active NFC device 195. Accordingly, the active NFC device 195 may include the transmitter antenna 150a and the memory 155, and the receiver antenna 150b may be omitted from the active NFC device 195. As described above, the active NFC device 195 is coupled to, and adapted to be in communication with, the control unit 110. In addition to, or instead of, being coupled to the control unit 110, the active NFC device 195 may be coupled to, and adapted to be in communication with, the vehicle sensor 125 (shown in FIGS. 1A and 1B). The active NFC device 195 contains information on its memory 155 that can be sent to other NFC devices using the transmitter antenna 150a, and can also read information stored on the other NFC devices; accordingly, the active NFC device 195 is not only able to collect information from other NFC devices, but is also able to alter the information on the other NFC devices if authorized to make such changes.

In addition to certain components of the apparatus 100 and the apparatus 135, the system 190 also includes an infrastructure 200 such as, for example, a fire hydrant. Although the infrastructure 200 is shown as the fire hydrant in FIG. 2A, in addition to, or instead of, the fire hydrant, the infrastructure 200 may be, include, or be part of, a utility box, a streetlight, a road sign, a traffic light, another infrastructure, and/or any combination thereof. Another short range communication device such as, for example, a passive NFC device 205, is attached to the infrastructure 200 and adapted to communicate with the active NFC device 195 of the vehicle 105. The passive NFC device 205 includes a receiver antenna 210 and a memory 215. In contrast to the active NFC device 195, the passive NFC device 205 contains information on the memory 215 that other NFC devices can read (or alter) but is not capable of reading any information itself.

In several embodiments, the transmitter antenna 150a of the active NFC device 195 is adapted to transmit data to the receiver antenna 210 of the passive NFC device 205 in response to the vehicle 105 impacting the infrastructure 200 (or an object nearby the infrastructure 200), as will be described in further detail below. In several embodiments, the active NFC device 195 is adapted to receive data from the control unit 110 and/or the vehicle sensor 125 in response to the vehicle 105 impacting the infrastructure 200 (or an object nearby the infrastructure 200), as will be described in further detail below.

Figure 2B:
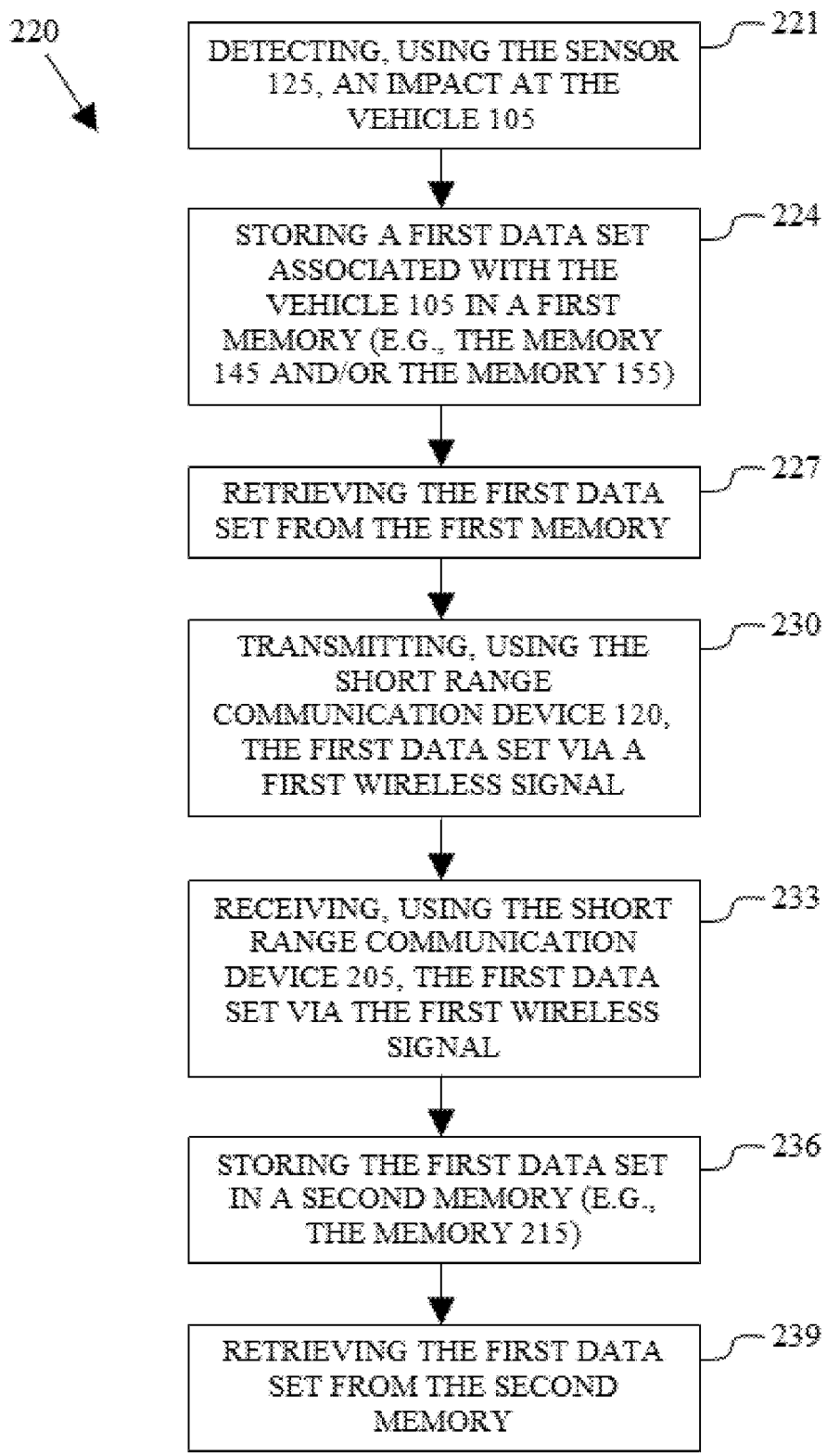
FIG. 2B is a flow chart illustration of a method of operating the system of FIG. 2A according to one or more embodiments of the present disclosure.

FIG. 2B is a flow chart illustration of a method of operating the system 190 of FIG. 2A according to one or more embodiments of the present disclosure. The method is carried out in response to the vehicle 105 impacting the infrastructure 200 (or an object nearby the infrastructure 200). In one such embodiment, as illustrated in FIG. 2B, the method is generally referred to by the reference numeral 220 and includes at a step 221 detecting, using the sensor 125, an impact at the vehicle 105. In several embodiments, the vehicle 105 is equipped with the sensor 125, and the sensor 125 includes the airbag sensor 125a, the antilock brake sensor 125b, the camera 125c, the accelerometer 125d, the speedometer 125e, the tachometer 125f, the bumper impact sensor 125g, the side impact sensor 125h, or any combination thereof. In addition to, or instead of, detecting the impact, the sensor 125 (or another component of the system 240) may be configured to detect another condition to initiate the operation of the system 190 or the execution of the method 220. Such a condition may include, but is not limited to, airbag deployment, abnormal GPS location, abnormal driving habits, abnormal lane keep assist status, abnormal turn signal status, abnormal seats occupied sensor status, etc.

At a step 224 before, during, or after detecting the impact, a first data set associated with the vehicle 105 is stored in a first memory (e.g., the memory 145 and/or the memory 155). In several embodiments, the first data set includes at least one of: a vehicle identification number of the vehicle 105; an identification of the owner of the vehicle 105; or insurance information associated with the vehicle 105 and the owner of the vehicle 105. For example, the first data set may include a valid/expired insurance status associated with the vehicle 105 and the owner of the vehicle 105. In addition, or instead, the first data set may include, but is not limited to, the status of the sensors 125a-i before, during, and/or after the occurrence of the impact (or the another condition), recent driving behavior associated with the vehicle 105' (e.g., aggressive, lane keep assist status/history, etc.), GPS data, or the like. In response to detecting the impact, at a step 227 the first data set is retrieved from the first memory.

In response to detecting the impact, at a step 230, using the short range communication device 120 (e.g., the active NFC device 195), the first data set is transmitted via a first wireless signal. In several embodiments, the short range communication device 120 is part of the vehicle 105. In several embodiments, the short range communication device 120 has the transmitter antenna 150a. In several embodiments, transmitting, using the short range communication device 120, the first data set via the first wireless signal comprises transmitting the first data set via the transmitter antenna 150a of the short range communication device 120.

In response to detecting the impact, at a step 233, using the short range communication device 205 (e.g., the passive NFC device), the first data set is received via the first wireless signal. In several embodiments, the short range communication device 205 is part of the infrastructure 200. In several embodiments, the infrastructure 200 is a party to the impact. In several embodiments, the short range communication device 205 has the receiver antenna 210. In several embodiments, receiving, using the short range communication device 205, the first data set via the first wireless signal comprises receiving the first data set via the receiver antenna 210 of the short range communication device 205.

In response to detecting the impact, at a step 236 the first data set is stored in a second memory (e.g., the memory 215). In several embodiments, the second memory is part of the short range communication device 205. Finally, at a step 239, after storing the first data set in the second memory, the first data set is retrieved from the second memory. In several embodiments, before, during, or after detecting the impact, a second data set associated with the infrastructure 200 is stored in the second memory. The second data set may include data analogous to that of the first data set, except that the data in the second data set is associated with the infrastructure 200 and/or an owner (or other entity) associated with the infrastructure. In one such embodiment, in response to detecting the impact, the second data set is: retrieved from the second memory, transmitted, using the short range communication device 205, via a second wireless signal, and received, using the short range communication device 120, via the second wireless signal.

In several embodiments, the operation of the system 190, or the execution of the method 220, occurs in response to the vehicle 105 impacting the infrastructure 200. In several embodiments, the operation of the system 190 or the execution of the method 220 optimizes the process of obtaining information after damage is inflicted to infrastructure by, among other things, transmitting a data set associated with the vehicle 105 to a short range communication device of the infrastructure 200, automatically storing the data set associated with the vehicle 105 on a memory associated with the infrastructure, and transmitting a data set associated with the infrastructure 200 to a short range communication device of the vehicle 105. In so doing, the operation of the system 190, or the execution of the method 220, avoids a situation where proper information was never exchanged when damage is inflicted to infrastructure, and reduces the possibility of hit-and-run, insurance fraud, and other misdeeds commonly committed in the aftermath of damage being inflicted to infrastructure.

Figure 3A:
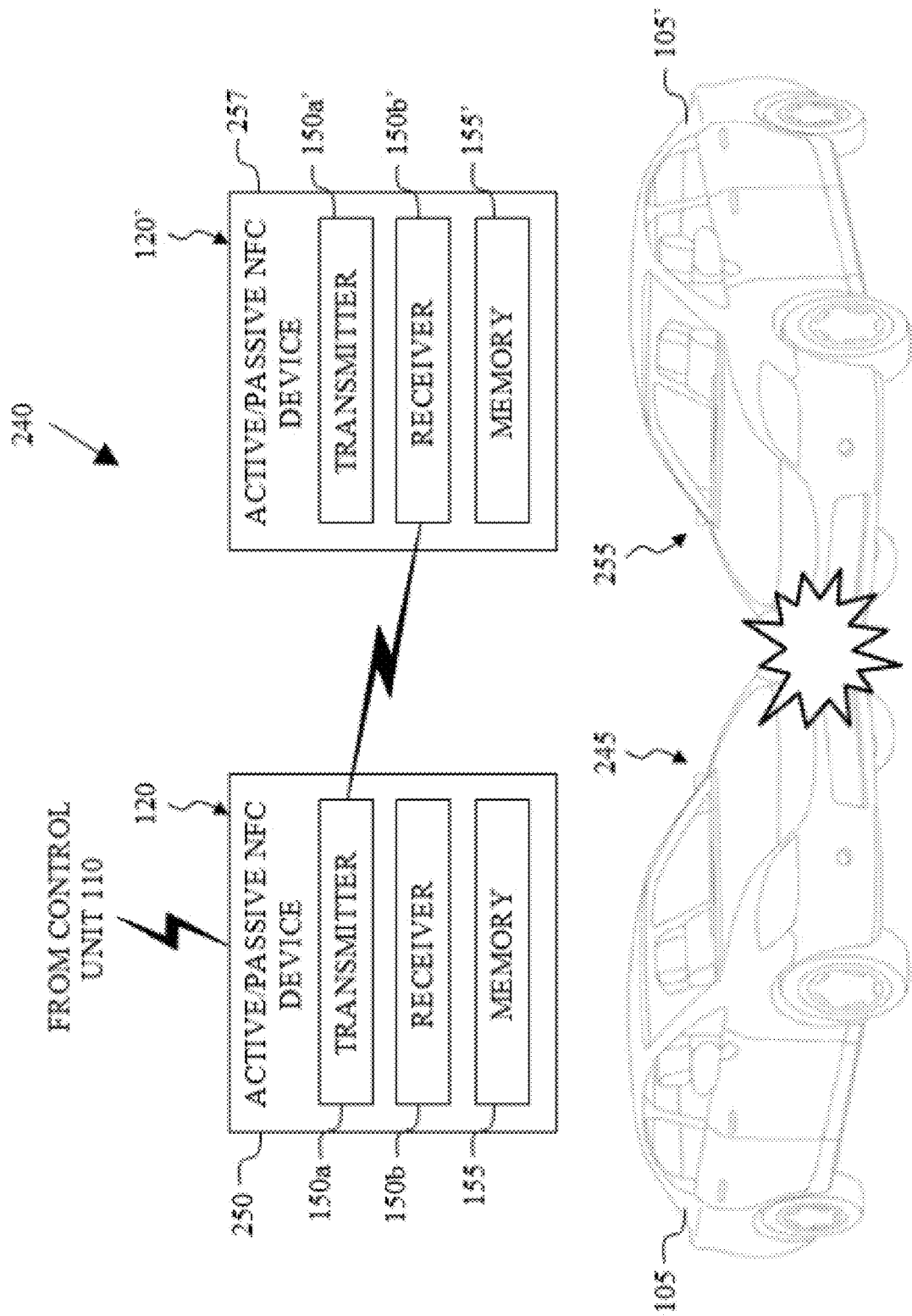
FIG. 3A is a diagrammatic illustration of a system in a first operational state according to one or more embodiments of the present disclosure.

FIG. 3A is a diagrammatic illustration of a system in a first operational state according to one or more embodiments of the present disclosure. In one such embodiment, as illustrated in FIG. 3A, the system is generally referred to by the reference numeral 240 and includes an apparatus 245 having the components of the apparatus 100 and the apparatus 135, which components are given the same reference numerals. In the embodiment shown in FIG. 3A, the short range communication device 120 of the vehicle 105 of the apparatus 245 is an active/passive NFC device 250. Accordingly, the active/passive NFC device 250 may include the transmitter antenna 150a, the receiver antenna 150b, and the memory 155. Alternatively, the transmitter antenna 150a and the receiver antenna 150b may be combined into a transceiver antenna capable of both sending and receiving wireless signals. As described above, the active/passive NFC device 250 is coupled to, and adapted to be in communication with, the control unit 110. In addition to, or instead of, being coupled to the control unit 110, the active/passive NFC device 250 may be coupled to, and adapted to be in communication with, the vehicle sensor 125 (shown in FIGS. 1A and 1B). The active/passive NFC device 250 contains information on its memory 155 that can be sent to other NFC devices using the transmitter antenna 150a, and can also read information stored on the other NFC devices; accordingly, the active/passive NFC device 250 is not only able to collect information from other NFC devices, but is also able to alter the information on other NFC devices if authorized to make such changes. Moreover, the active/passive NFC device 250 contains information on the memory 155 that other NFC devices can read (or alter) via the receiver antenna 150b.

Figure 3B:
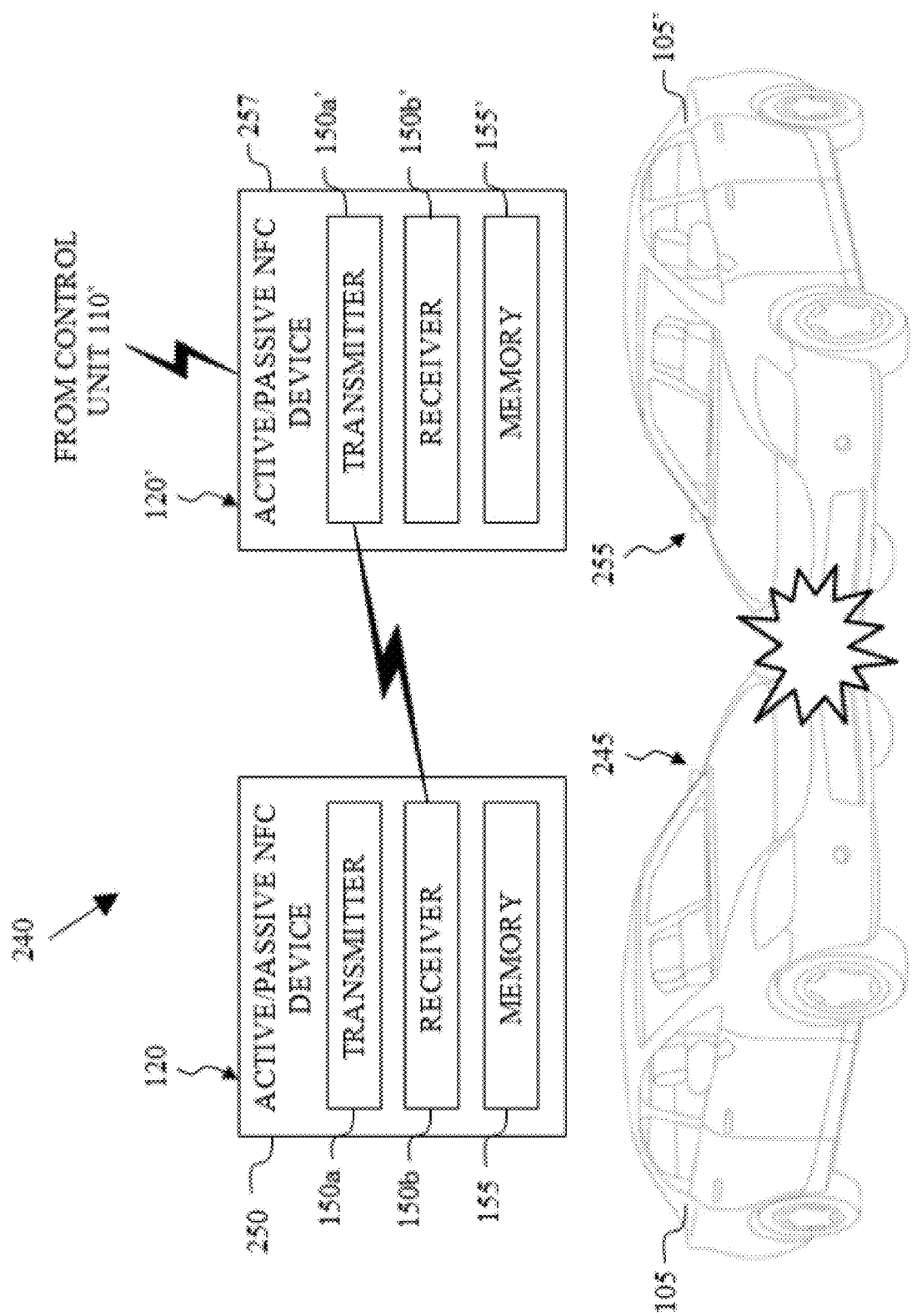
FIG. 3B is a diagrammatic illustration of the system of FIG. 3A in a second operational state according to one or more embodiments of the present disclosure.

FIG. 3B is a diagrammatic illustration of the system 240 of FIG. 3A in a second operational state according to one or more embodiments of the present disclosure. In one such embodiment, in addition to the apparatus 245 having certain components of the apparatus 100 and the apparatus 135, the system 240 also includes an apparatus 290 having the components of the apparatus 100 and the apparatus 135, which components are given the same reference numerals with the suffix (') added. In the embodiment shown in FIG. 3B, the short range communication device 120' of the vehicle 105' of the apparatus 290 is an active/passive NFC device 257. In several embodiments, the active/passive NFC device 257 is substantially identical to the active/passive NFC device 250. The active/passive NFC device 257 is coupled to, and adapted to be in communication with, the control unit 110'. In addition to, or instead of, being coupled to the control unit 110', the active/passive NFC device 257 may be coupled to, and adapted to be in communication with, the vehicle sensor 125'. The active/passive NFC device 257 contains information on its memory 155' that can be sent to other NFC devices using the transmitter antenna 150a', and can also read information stored on the other NFC devices; accordingly, the active/passive NFC device 257 is not only able to collect information from other NFC devices, but is also able to alter the information on other NFC devices if authorized to make such changes. Moreover, the active/passive NFC device 257 contains information on the memory 155' that other NFC devices can read (or alter) via the receiver antenna 150b'.

In several embodiments, in response to the vehicle 105 impacting the vehicle 105' (or an object nearby the vehicle 105') the active/passive NFC device 250 is adapted to receive data from the control unit 110 and/or the vehicle sensor 125, the transmitter antenna 150a of the active/passive NFC device 250 is adapted to transmit data to the receiver antenna 150b' of the active/passive NFC device 257, and/or the receiver antenna 150b is adapted to receive data from the transmitter antenna 150a' of the active/passive NFC device 250, as will be described in further detail below. Similarly, in several embodiments, in response to the vehicle 105' impacting the vehicle 105 (or an object nearby the vehicle 105) the active/passive NFC device 257 is adapted to receive data from the control unit 110' and/or the vehicle sensor 125', the transmitter antenna 150a' of the active/passive NFC device 257 is adapted to transmit data to the receiver antenna 150b of the active/passive NFC device 250, and/or the receiver antenna 150b' is adapted to receive data from the transmitter antenna 150a of the active/passive NFC device 250, as will be described in further detail below.

Figure 3C:
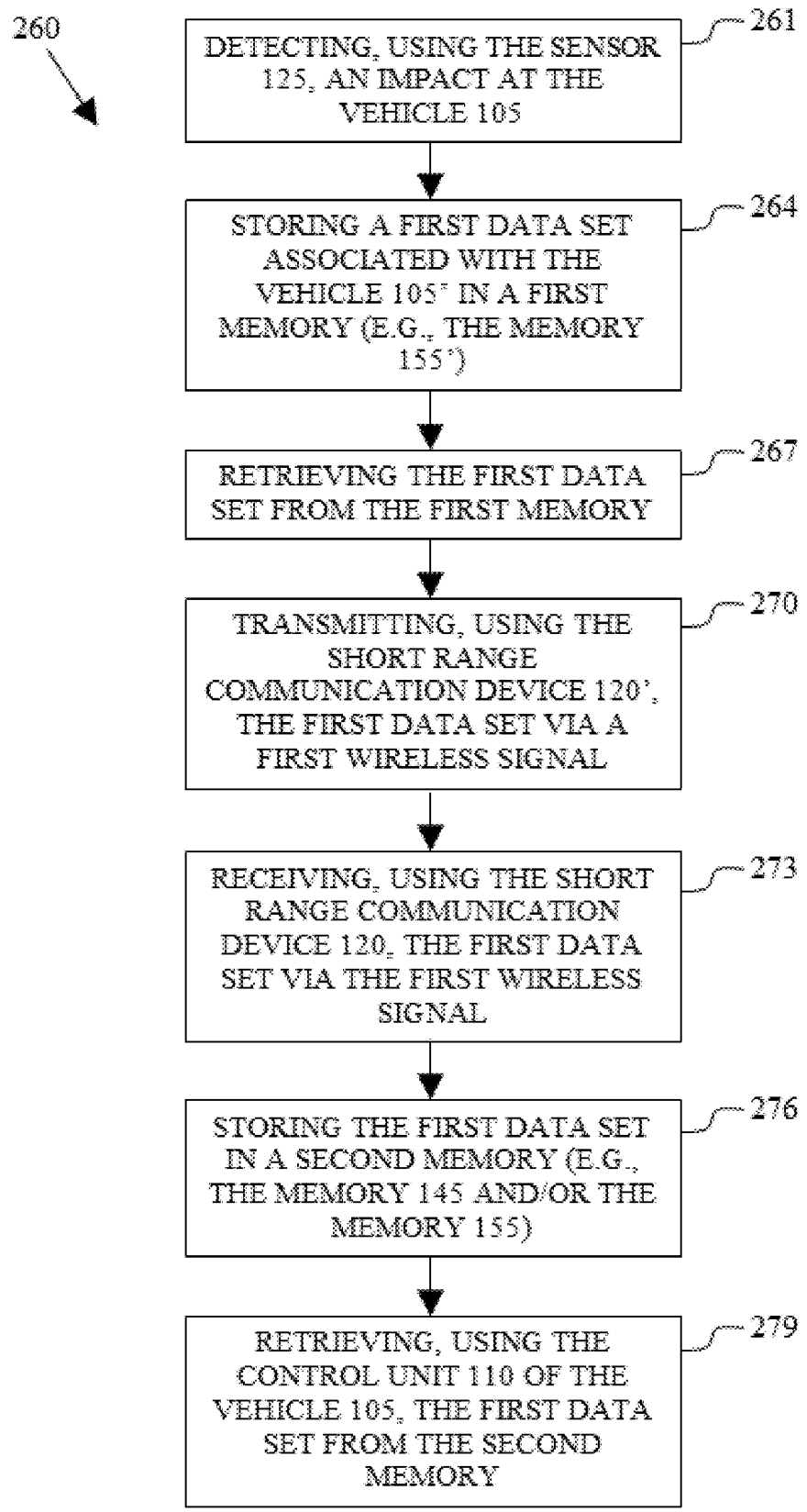
FIG. 3C is a flow chart illustration of a method of operating the system of FIGS. 3A and 3B according to one or more embodiments of the present disclosure.

FIG. 3C is a flow chart illustration of a method of operating the system 240 of FIGS. 3A and 3B according to one or more embodiments of the present disclosure. The method is carried out in response to the vehicle 105 impacting the vehicle 105' (or an object nearby the vehicle 105'). In one such embodiment, as illustrated in FIG. 3C, the method is generally referred to by the reference numeral 260 and includes at a step 261 detecting, using the sensor 125, an impact at the vehicle 105. In several embodiments, the vehicle 105 is equipped with the sensor 125 and the sensor 125 includes the airbag sensor 125a, the antilock brake sensor 125b, the camera 125c, the accelerometer 125d, the speedometer 125e, the tachometer 125f, the bumper impact sensor 125g, the side impact sensor 125h, or any combination thereof. In addition to, or instead of, detecting the impact, the sensor 125 (or another component of the system 240) may be configured to detect another condition to initiate the operation of the system 240 or the execution of the method 260. Such a condition may include, but is not limited to, airbag deployment, abnormal GPS location, abnormal driving habits, abnormal lane keep assist status, abnormal turn signal status, abnormal seats occupied sensor status, etc.

At a step 264 before, during, or after detecting the impact, a first data set associated with the vehicle 105' is stored in a first memory (e.g., the memory 155'). In several embodiments, the vehicle 105' is a party to the impact. In several embodiments, the first data set includes at least one of: a vehicle identification number of the vehicle 105'; an identification of the owner of the vehicle 105'; or insurance information associated with the vehicle 105' and the owner of the vehicle 105'. For example, the first data set may include a valid/expired insurance status associated with the vehicle 105' and the owner of the vehicle 105'. In addition, or instead, the first data set may include, but is not limited to, the status of the sensors 125a-i before, during, and/or after the occurrence of the impact (or the another condition), recent driving behavior associated with the vehicle 105' (e.g., aggressive, lane keep assist status/history, etc.), GPS data, or the like. In response to detecting the impact, at a step 267 the first data set is retrieved from the first memory.

In response to detecting the impact, at a step 270, using the short range communication device 120' (e.g., the active/passive NFC device 257), the first data set is transmitted via a first wireless signal. In several embodiments, the short range communication device 120' is part of the vehicle 105'. In several embodiments, the short range communication device 120' has the transmitter antenna 150a'. In several embodiments, transmitting, using the short range communication device 120', the first data set via the first wireless signal comprises transmitting the first data set via the transmitter antenna 150a' of the short range communication device 120'.

In response to detecting the impact, at a step 273, using the short range communication device 120 (e.g., the active/passive NFC device 250), the first data set is received via the first wireless signal. In several embodiments, the short range communication device 120 is part of the vehicle 105. In several embodiments, the short range communication device 120 has the receiver antenna 150b. In several embodiments, receiving, using the short range communication device 120, the first data set via the first wireless signal comprises receiving the first data set via the receiver antenna 150b of the short range communication device 120.

In response to detecting the impact, at a step 276 the first data set is stored in a second memory (e.g., the memory 145 and/or the memory 155). In several embodiments, the second memory is part of either the short range communication device 120 or the control unit 110 of the vehicle 105. Finally, at a step 279, after storing the first data set in the second memory, using the control unit 110 of the vehicle 105, the first data set is retrieved from the second memory. In several embodiments, before, during, or after detecting the impact, a second data set associated with the vehicle 105 is stored in the second memory. The second data set may include data analogous to that of the first data set, except that the data in the second data set is associated with the vehicle 105 and/or an owner of the vehicle 105. In one such embodiment, in response to detecting the impact, the second data set is retrieved from the second memory, using the short range communication device 120, the second data set is transmitted via a second wireless signal, and, using the short range communication device 120', the second data set is received via the second wireless signal.

In several embodiments, the operation of the system 240, or the execution of the method 260, occurs in response to the vehicle 105 impacting the vehicle 105'. Both vehicles 105, and 105' may be moving during the impact. Alternatively one of the vehicles 105 and 105' may be stationary during the impact while the other of the vehicles 105 and 105' is moving. In several embodiments, the operation of the system 240 or the execution of the method 260 optimizes the process of exchanging information after a traffic accident by, among other things, transmitting a data set associated with the vehicle 105' to a short range communication device of the vehicle 105, automatically storing the data set associated with the vehicle 105' on a memory accessible by the control unit 110 of the vehicle 105, and transmitting a data set associated with the vehicle 105 to a short range communication device of the vehicle 105'. In so doing, the operation of the system 240, or the execution of the method 260, avoids a situation where proper information was never exchanged between parties to a traffic accident, and reduces the possibility of hit-and-run, insurance fraud, and other misdeeds commonly committed in the aftermath of a traffic accident.

Figure 4A:
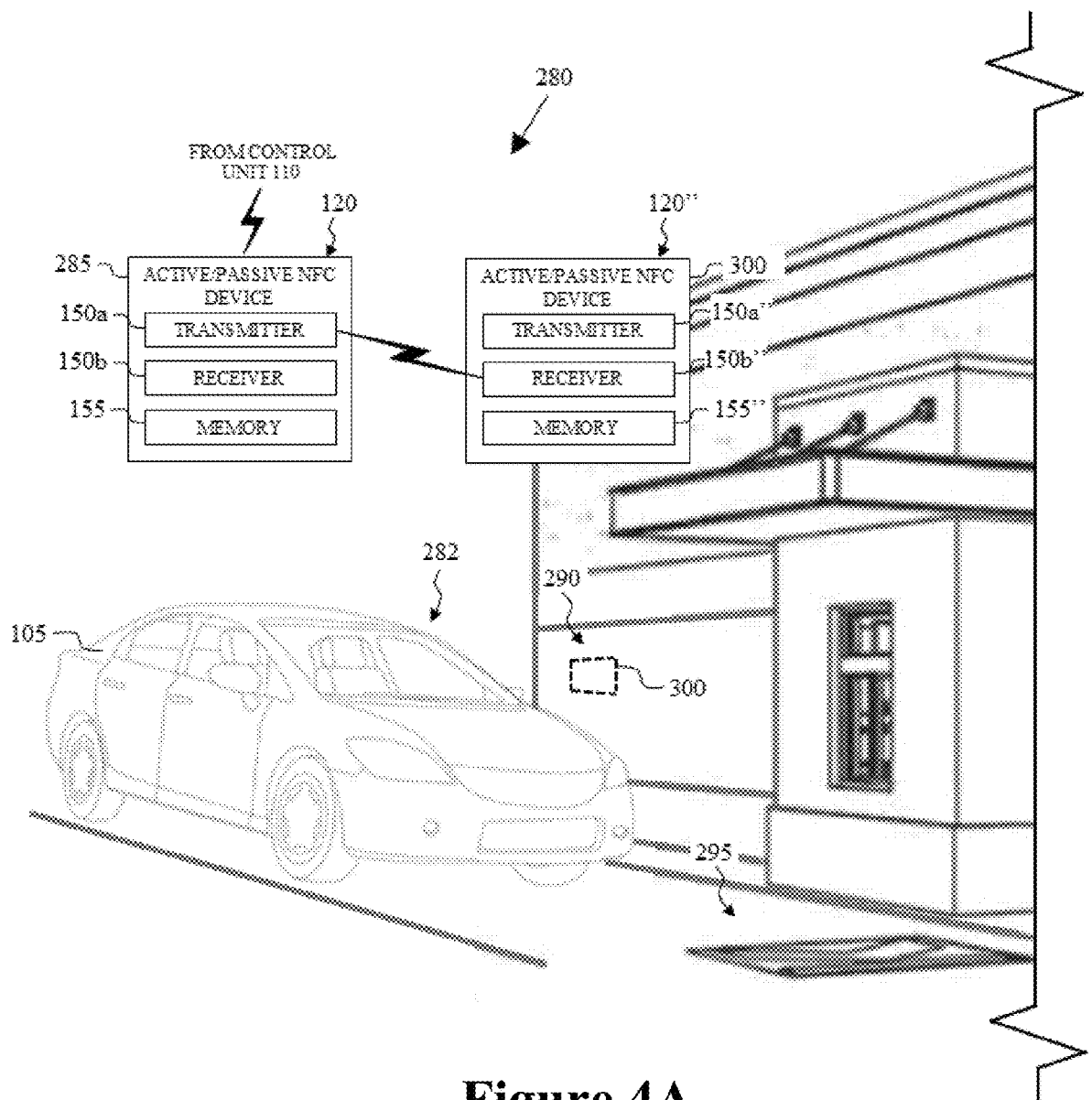
FIG. 4A is a diagrammatic illustration of a system in a first operational state according to one or more embodiments of the present disclosure.

FIG. 4A is a diagrammatic illustration of a system in a first operational state according to one or more embodiments of the present disclosure. In one such embodiment, as illustrated in FIG. 4A, the system is generally referred to by the reference numeral 280 and includes an apparatus 282 having the components of the apparatus 100 and the apparatus 135, which components are given the same reference numerals. In the embodiment shown in FIG. 4A, the short range communication device 120 of the vehicle 105 of the apparatus 282 is an active/passive NFC device 285. Accordingly, the active/passive NFC device 285 may include the transmitter antenna 150a, the receiver antenna 150b, and the memory 155. Alternatively, the transmitter antenna 150a and the receiver antenna 150b may be combined into a transceiver antenna capable of both sending and receiving wireless signals. As described above, the active/passive NFC device 285 is coupled to, and adapted to be in communication with, the control unit 110. In addition to, or instead of, being coupled to the control unit 110, the active/passive NFC device 285 may be coupled to, and adapted to be in communication with, the vehicle sensor 125 (shown in FIGS. 1A and 1B). The active/passive NFC device 285 contains information on its memory 155 that can be sent to other NFC devices using the transmitter antenna 150a, and can also read information stored on the other NFC devices; accordingly, the active/passive NFC device 285 is not only able to collect information from other NFC devices, but is also able to alter the information on other NFC devices if authorized to make such changes. Moreover, the active/passive NFC device 285 contains information on the memory 155 that other NFC devices can read (or alter) via the receiver antenna 150b.

Figure 4B:
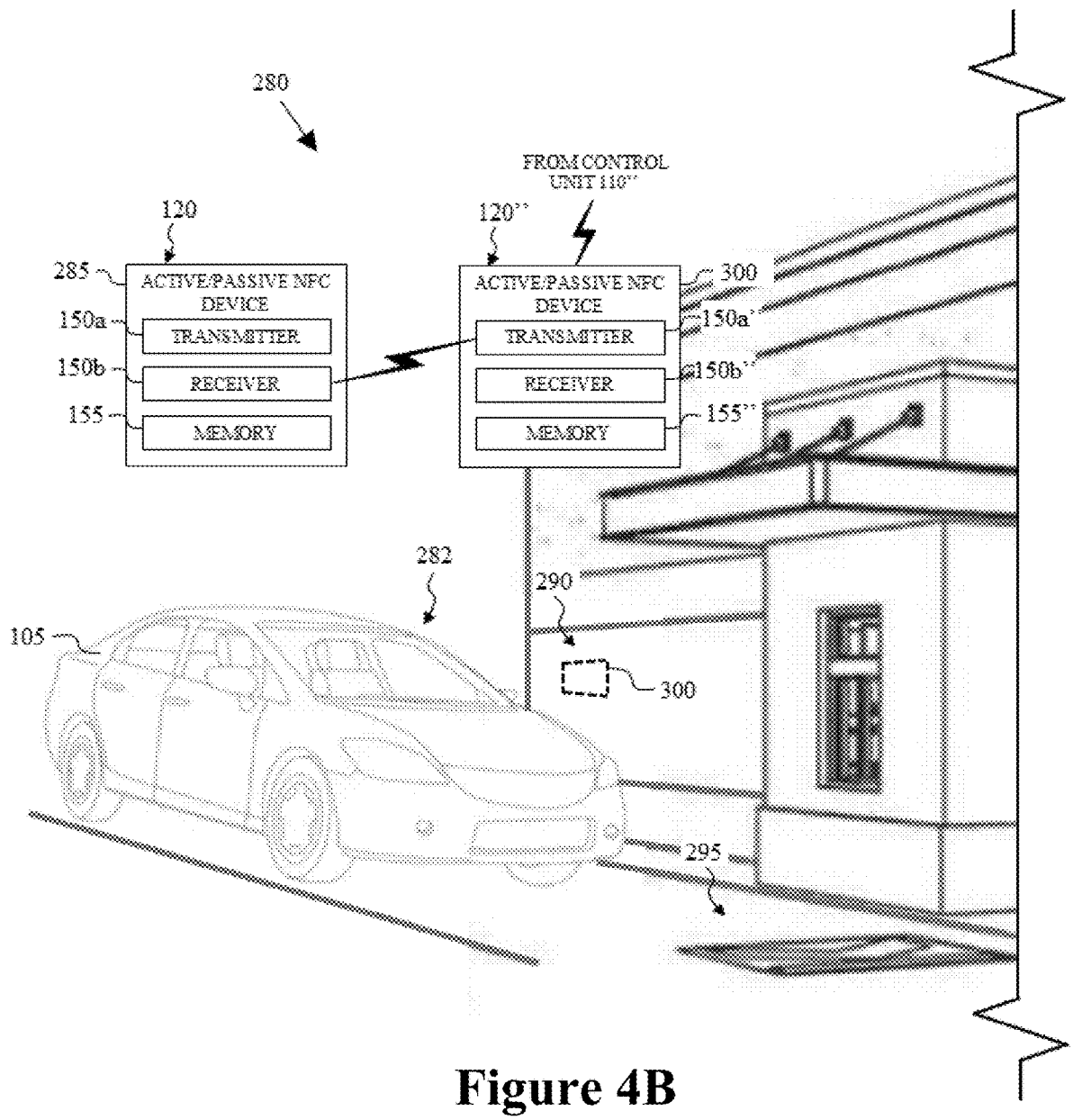
FIG. 4B is a diagrammatic illustration of the system of FIG. 4A in a second operational state according to one or more embodiments of the present disclosure.

FIG. 4B is a diagrammatic illustration of the system 280 of FIG. 4A in a second operational state according to one or more embodiments of the present disclosure. In one such embodiment, in addition to the apparatus 282 having certain components of the apparatus 100 and the apparatus 135, the system 280 also includes an apparatus 290 at least some of the components of the apparatus 100 and the apparatus 135, which components are given the same reference numerals with the suffix (") added. However, in contrast to the apparatus 100 and the apparatus 135, the apparatus 290 may include at least some of the components of the apparatus 100 and the apparatus 135 incorporated into a service lane 295 such as, for example, a restaurant drive-through lane. In addition to, or instead of, being associated with a restaurant drive-through lane, the service lane 295 may also be, include, or be part of, a roadway toll lane, a bank drive-through lane, an automotive service lane (e.g., an oil change lane), another service lane application, or any combination thereof. In the embodiment shown in FIG. 4B, the short range communication device 120" of the service lane 295 of the apparatus 290 is an active/passive NFC device 300. In several embodiments, the active/passive NFC device 300 is substantially identical to the active/passive NFC device 285. The active/passive NFC device 300 is coupled to, and adapted to be in communication with, the control unit 110". The active/passive NFC device 300 contains information on its memory 155" that can be sent to other NFC devices using the transmitter antenna 150a", and can also read information stored on the other NFC devices; accordingly, the active/passive NFC device 300 is not only able to collect information from other NFC devices, but is also able to alter the information on other NFC devices if authorized to make such changes. Moreover, the active/passive NFC device 300 contains information on the memory 155" that other NFC devices can read (or alter) via the receiver antenna 150b".

In several embodiments, in response to the vehicle 105 driving through the service lane 295 (or nearby the service lane 295) the active/passive NFC device 285 is adapted to receive data from the control unit 110, the transmitter antenna 150a of the active/passive NFC device 285 is adapted to transmit data to the receiver antenna 150b" of the active/passive NFC device 300, and/or the receiver antenna 150b is adapted to receive data from the transmitter antenna 150a" of the active/passive NFC device 285, as will be described in further detail below. Similarly, in several embodiments, in response to the vehicle 105 driving through the service lane 295 (or nearby the service lane 295) the active/passive NFC device 300 is adapted to receive data from the control unit 110", the transmitter antenna 150a" of the active/passive NFC device 300 is adapted to transmit data to the receiver antenna 150b of the active/passive NFC device 285, and/or the receiver antenna 150b" is adapted to receive data from the transmitter antenna 150a of the active/passive NFC device 285, as will be described in further detail below.

Figure 4C:
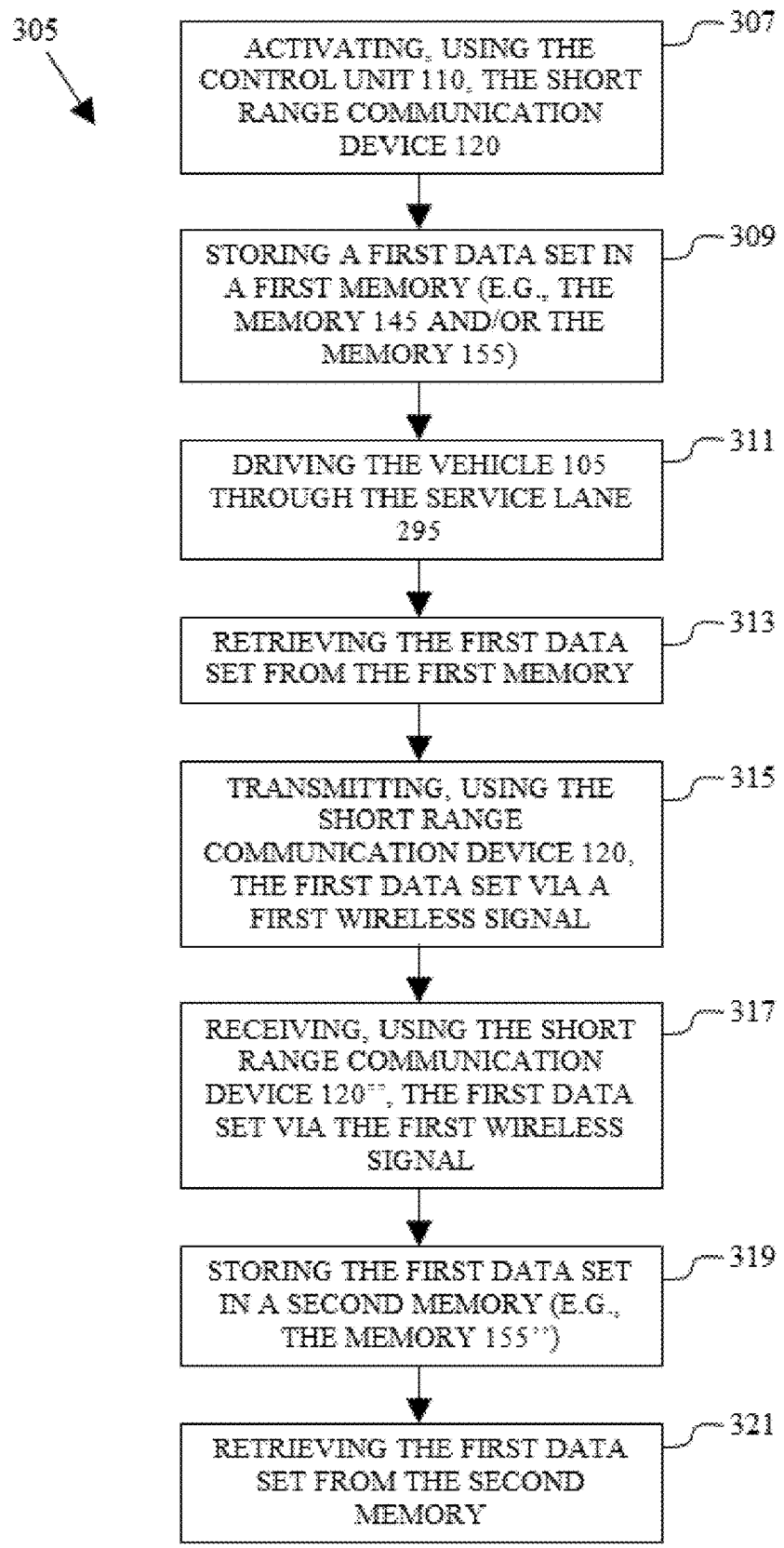
FIG. 4C is a flow chart illustration of a method of operating the system of FIGS. 4A and 4B according to one or more embodiments of the present disclosure.

FIG. 4C is a flow chart illustration of a method of operating the system 280 of FIGS. 4A and 4B according to one or more embodiments of the present disclosure. The method is carried out in response to the vehicle 105 driving through the service lane 295 (or nearby the service lane 295). In one such embodiment, as illustrated in FIG. 4C, the method is generally referred to by the reference numeral 305 and includes at a step 307 activating, using the control unit 110, the short range communication device 120 (e.g., the active/passive NFC device 285). In several embodiments, the control unit 110 and the short range communication device 120 are each part of the vehicle 105. In several embodiments, activating, using the control unit 110, the short range communication device 120 comprises receiving an input via the in-vehicle infotainment system 130 associated with the vehicle 105. At a step 309, before, during, or after activating the short range communication device 120, a first data set is stored in a first memory (e.g., the memory 145 and/or the memory 155). In several embodiments, the first data set includes payment information associated with an occupant of the vehicle 105. At a step 311 the vehicle 105 is driven through the service lane 295. In response to driving through the service lane 295, at a step 313 the first data set is retrieved from the first memory.

In response to driving through the service lane 295, at a step 315, using the short range communication device 120, the first data set is transmitted via a first wireless signal. In several embodiments, the short range communication device 120 has the transmitter antenna 150a. In several embodiments, transmitting, using the short range communication device 120, the first data set via the first wireless signal comprises transmitting the first data set via the transmitter antenna 150a of the short range communication device 120.

In response to driving through the service lane 295, at a step 317, using the short range communication device 120" (e.g., the active/passive NFC device 300), the first data set is retrieved via the first wireless signal. In several embodiments, the short range communication device 120" is part of the service lane 295. In several embodiments, the short range communication device 120" has the receiver antenna 150b". In several embodiments, receiving, using the short range communication device 120", the first data set via the first wireless signal comprises receiving the first data set via the receiver antenna 150b" of the short range communication device 120".

In response to driving through the service lane 295, at a step 319 the first data set is stored in a second memory (e.g., the memory 155"). In several embodiments, the second memory is part of the short range communication device 120". Finally, at a step 321, after storing the first data set in the second memory, the first data set is retrieved from the second memory. In several embodiments, before, during, or after activating the short range communication device 120, a second data set associated with the service lane 295 is stored in the second memory. In one such embodiment, in response to driving through the service lane 295, the second data set is retrieved from the second memory, using the short range communication device 120", the second data set is transmitted via a second wireless signal, and, using the short range communication device 120, the second data set is retrieved via the second wireless signal.

In several embodiments, the operation of the system 280, or the execution of the method 305, occurs in response to the vehicle 105 driving through the service lane 195 when the short range communication device 120 is activated. In several embodiments, the operation of the system 280 or the execution of the method 305 optimizes the process of exchanging payment information by, among other things, transmitting a data set associated with the vehicle 105 to a short range communication device associated with the service lane 295, and transmitting a data set associated with a retail transaction to a short range communication device of the vehicle 105. In so doing, the operation of the system 280, or the execution of the method 305, avoids a situation where proper payment information was never exchanged between parties to a transaction, and reduces the time required to complete the payment transaction.

In various embodiments, any one of the short range communication devices 120, 120', 120" and/or 205, the active NFC device 195, the passive NFC device 205, and the active/passive NFC devices 250, 257, 285, and/or 300 may be replaced with another suitable short range communication device such as, for example, another active short range communication device, another passive short range communication device, another active/passive short range communication device, or any combination thereof.

Figure 5:
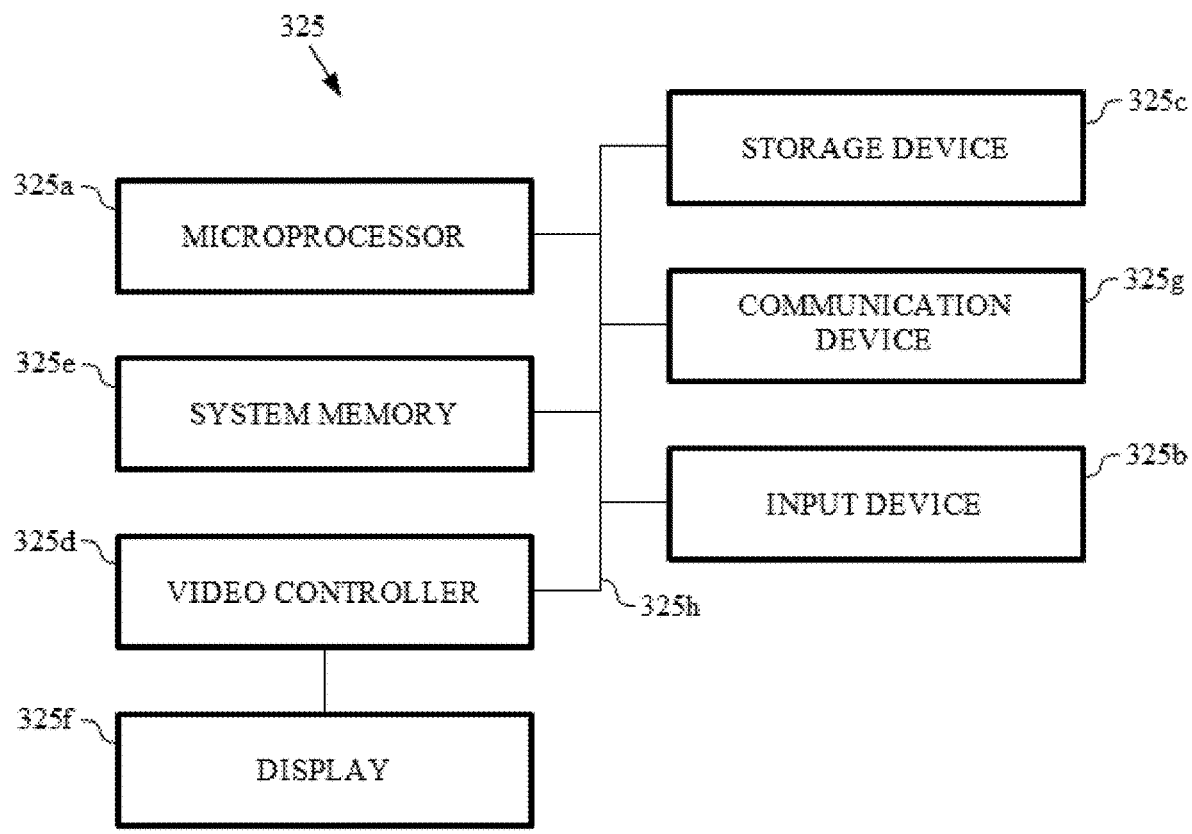
FIG. 5 is a diagrammatic illustration of a node for implementing one or more embodiments of the present disclosure, according to one or more embodiments of the present disclosure.

In an embodiment, as illustrated in FIG. 5, an illustrative node 325 for implementing one or more embodiments of one or more of the above-described networks, elements, systems (e.g., 190, 240, and/or 280), methods (e.g., 220, 260, and/or 305) and/or steps (e.g., 221, 224, 227, 230, 233, 236, 239, 261, 264, 267, 270, 273, 276, 279, 307, 309, 311, 313, 315, 317, 319, and/or 321), and/or any combination thereof, is depicted. The node 325 includes a microprocessor 325a, an input device 325b, a storage device 325c, a video controller 325d, a system memory 325e, a display 325f, and a communication device 325g all interconnected by one or more buses 325h. In several embodiments, the storage device 325c may include a floppy drive, hard drive, CD-ROM, optical drive, any other form of storage device and/or any combination thereof. In several embodiments, the storage device 325c may include, and/or be capable of receiving, a floppy disk, CD-ROM, DVD-ROM, or any other form of computer-readable medium that may contain executable instructions. In several embodiments, the communication device 325g may include a modem, network card, or any other device to enable the node to communicate with other nodes. In several embodiments, any node represents a plurality of interconnected (whether by intranet or Internet)

computer systems, including without limitation, personal computers, mainframes, PDAs, smartphones and cell phones.

In several embodiments, one or more of the components of any of the above-described systems include at least the node 325 and/or components thereof, and/or one or more nodes that are substantially similar to the node 325 and/or components thereof. In several embodiments, one or more of the above-described components of the node 325 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software, such as Oracle, Microsoft Access, SyBase, or DBase II, for example. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described systems, methods, and/or any combination thereof. In several embodiments, such a processor may include one or more of the microprocessor 325a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method has been disclosed. The method generally includes detecting, using a sensor, an impact at a vehicle; before, during, or after detecting the impact, storing a first data set associated with the vehicle in a first memory; in response to detecting the impact, retrieving the first data set from the first memory; transmitting, using a first short range communication device, the first data set via a first wireless signal; receiving, using a second short range communication device, the first data set via the first wireless signal; and storing the first data set in a second memory; and after storing the first data set in the second memory, retrieving the first data set from the second memory; wherein the first short range communication device is part of the vehicle; and wherein the second short range communication device is part of an infrastructure.

The foregoing method embodiment may include one or more of the following elements, either alone or in combination with one another:

The infrastructure is a party to the impact.

Before, during, or after detecting the impact, storing a second data set associated with the infrastructure in the second memory; and in response to detecting the impact, retrieving the second data set from the second memory; transmitting, using the second short range communication device, the second data set via a second wireless signal; and receiving, using the first short range communication device, the second data set via the second wireless signal.

The second memory is part of the second short range communication device.

The vehicle is equipped with the sensor; and the sensor includes an airbag sensor, an antilock brake sensor, a camera, an accelerometer, a speedometer, a tachometer, a bumper impact sensor, a side impact sensor, or any combination thereof.

The second short range communication device has a receiver antenna; the first short range communication device has a transmitter antenna; transmitting, using the first short range communication device, the first data set via the first wireless signal includes transmitting the first data set via the transmitter antenna of the first short range communication device; and receiving, using the second short range communication device, the first data set via the first wireless signal includes receiving the first data set via the receiver antenna of the second short range communication device.

The first data set includes at least one of: a vehicle identification number of the vehicle; an identification of the owner of the vehicle; or insurance information associated with the vehicle and the owner of the vehicle.

A system has also been disclosed. The system generally includes a vehicle equipped with a first short range communication device; a sensor adapted to detect an impact at the vehicle; a first memory on which a first data set associated with the vehicle is stored; an infrastructure equipped with a second short range communication device; and a second memory; wherein, in response to the sensor detecting the impact, the first data set is adapted to be: retrieved from the first memory; transmitted via a first wireless signal using the first short range communication device; received via the first wireless signal using the second short range communication device; and stored on the second memory; wherein, after the first data set is stored on the second memory, the first data set is retrievable from the second memory.

The foregoing system embodiment may include one or more of the following elements, either alone or in combination with one another:

The infrastructure is adapted to be party to the impact.

A second data set associated with the infrastructure is stored on the second memory; and, in response to the sensor detecting the impact, the second data set is adapted to be: retrieved from the second memory; transmitted via a second wireless signal using the second short range communication device; and received via the second wireless signal using the first short range communication device.

The second memory is part of the second short range communication device.

The vehicle is equipped with the sensor; and the sensor includes an airbag sensor, an antilock brake sensor, a camera, an accelerometer, a speedometer, a tachometer, a bumper impact sensor, a side impact sensor, or any combination thereof.

The second short range communication device has a receiver antenna; the first short range communication device has a transmitter antenna; and the first data set is: transmittable using the transmitter antenna of the first short range communication device; and receivable using the receiver antenna of the second short range communication device.

The first data set includes at least one of: a vehicle identification number of the vehicle; an identification of the owner of the vehicle; or insurance information associated with the vehicle and the owner of the vehicle.

An apparatus has also been disclosed. The apparatus generally includes one or more non-transitory computer readable mediums; and a plurality of instructions stored on the one or more non-transitory computer readable mediums and executable by one or more processors, the plurality of instructions including: instructions that, when executed, cause the one or more processors to detect, using a sensor, an impact at a vehicle; instructions that, when executed, cause the one or more processors to store a first data set associated with the vehicle in a first memory before, during, or after detecting the impact; instructions that, when executed, cause the one or more processors, in response to detecting the impact, to: retrieve the first data set from the first memory; transmit, using a first short range communication device, the first data set via a first wireless signal; receive, using a second short range communication device, the first data set via the first wireless signal; and store the first data set in a second memory; and instructions that, when executed, cause the one or more processors, after storing the first data set in the second memory, to retrieve the first data set from the second memory; wherein the first short range communication device is part of the vehicle; and wherein the second short range communication device is part of an infrastructure.

The foregoing apparatus embodiment may include one or more of the following elements, either alone or in combination with one another:

The infrastructure is a party to the impact.

The plurality of instructions further include: instructions that, when executed, cause the one or more processors to store a second data set associated with the infrastructure in the second memory before, during, or after detecting the impact; and instructions that, when executed, cause the one or more processors, in response to detecting the impact, to: retrieve the second data set from the second memory; transmit, using the second short range communication device, the second data set via a second wireless signal; and receive, using the first short range communication device, the second data set via the second wireless signal.

The second memory is part of the second short range communication device.

The vehicle is equipped with the sensor; and the sensor includes an airbag sensor, an antilock brake sensor, a camera, an accelerometer, a speedometer, a tachometer, a bumper impact sensor, a side impact sensor, or any combination thereof.

The first data set includes at least one of: a vehicle identification number of the vehicle; an identification of the owner of the vehicle; or insurance information associated with the vehicle and the owner of the vehicle.

Another method has also been disclosed. The method generally includes detecting, using a sensor, an impact at a first vehicle; before, during, or after detecting the impact, storing a first data set associated with a second vehicle in a first memory; in response to detecting the impact, retrieving the first data set from the first memory; transmitting, using a first short range communication device, the first data set via a first wireless signal; receiving, using a second short range communication device, the first data set via the first wireless signal; and storing the first data set in a second memory; and after storing the first data set in the second memory, retrieving, using a control unit of the first vehicle, the first data set from the second memory; wherein the first short range communication device is part of the second vehicle and the second short range communication device is part of the first vehicle.

The foregoing method embodiment may include one or more of the following elements, either alone or in combination with one another:

The second vehicle is a party to the impact.

Before, during, or after detecting the impact, storing a second data set associated with the first vehicle in the second memory; and in response to detecting the impact, retrieving the second data set from the second memory; transmitting, using the second short range communication device, the second data set via a second wireless signal; and receiving, using the first short range communication device, the second data set via the second wireless signal.

The second memory is part of either the second short range communication device or the control unit of the first vehicle.

The first vehicle is equipped with the sensor; and the sensor includes an airbag sensor, an antilock brake sensor, a camera, an accelerometer, a speedometer, a tachometer, a bumper impact sensor, a side impact sensor, or any combination thereof.

The second short range communication device has a receiver antenna; the first short range communication device has a transmitter antenna; transmitting, using the first short range communication device, the first data set via the first wireless signal includes transmitting the first data set via the transmitter antenna of the first short range communication device; and receiving, using the second short range communication device, the first data set via the first wireless signal includes receiving the first data set via the receiver antenna of the second short range communication device.

The first data set includes at least one of: a vehicle identification number of the second vehicle; an identification of the owner of the second vehicle; or insurance information associated with the second vehicle and the owner of the second vehicle.

Another system has also been disclosed. The system generally includes a first vehicle equipped with a first short range communication device; a sensor adapted to detect an impact at the first vehicle; a first memory on which a first data set associated with the second vehicle is stored; a second vehicle equipped with a second short range communication device; and a second memory; wherein, in response to the sensor detecting the impact, the first data set is adapted to be: retrieved from the first memory; transmitted, using the second short range communication device, via a first wireless signal; received, using the first short range communication device, via the first wireless signal; and stored in the second memory; and wherein, after the first data set is stored in the second memory, the first data set is retrievable from the second memory using a control unit of the first vehicle.

The foregoing system embodiment may include one or more of the following elements, either alone or in combination with one another:

The second vehicle is adapted to be a party to the impact.

A second data set associated with the first vehicle is stored on the second memory; and in response to the sensor detecting the impact, the second data set is adapted to be: retrieved from the second memory; transmitted, using the first short range communication device, via a second wireless signal; and received, using the second short range communication device, via the second wireless signal.

The second memory is part of either the first short range communication device or the control unit of the first vehicle.

The first vehicle is equipped with the sensor; and the sensor includes an airbag sensor, an antilock brake sensor, a camera, an accelerometer, a speedometer, a tachometer, a bumper impact sensor, a side impact sensor, or any combination thereof.

The first short range communication device has a receiver antenna; second short range communication device has a transmitter antenna; the first data set is transmittable via the transmitter antenna of the second short range communication device; and the first data set is receivable via the receiver antenna of the first short range communication device.

The first data set includes at least one of: a vehicle identification number of the second vehicle; an identification of the owner of the second vehicle; or insurance information associated with the second vehicle and the owner of the second vehicle.

Another apparatus has also been disclosed. The apparatus generally includes one or more non-transitory computer readable mediums; and a plurality of instructions stored on the one or more non-transitory computer readable mediums and executable by one or more processors, the plurality of instructions including: instructions that, when executed, cause the one or more processors to detect, using a sensor, an impact at a first vehicle; instructions that, when executed, cause the one or more processors to store a first data set associated with a second vehicle in a first memory before, during, or after detecting the impact; instructions that, when executed, cause the one or more processors, in response to detecting the impact, to: retrieve the first data set from the first memory; transmit, using a first short range communication device, the first data set via a first wireless signal; receive, using a second short range communication device, the first data set via the first wireless signal; and store the first data set in a second memory; instructions that, when executed, cause the one or more processors, after storing the first data set in the second memory, to retrieve the first data set from the second memory using a control unit of the first vehicle; wherein the first short range communication device is part of the second vehicle; and wherein the second short range communication device is part of the first vehicle.

The foregoing apparatus embodiment may include one or more of the following elements, either alone or in combination with one another:

The second vehicle is a party to the impact.

The plurality of instructions further includes: instructions that, when executed, cause the one or more processors to store a second data set associated with the first vehicle in the second memory before, during, or after detecting the impact; and instructions that, when executed, cause the one or more processors, in response to detecting the impact, to: retrieve the second data set from the second memory; transmit, using the second short range communication device, the second data set via a second wireless signal; and receive, using the first short range communication device, the second data set via the second wireless signal.

The second memory is part of either the second short range communication device or the control unit of the first vehicle.

The first vehicle is equipped with the sensor; and the sensor includes an airbag sensor, an antilock brake sensor, a camera, an accelerometer, a speedometer, a tachometer, a bumper impact sensor, a side impact sensor, or any combination thereof.

The first data set includes at least one of: a vehicle identification number of the second vehicle; an identification of the owner of the second vehicle; or insurance information associated with the second vehicle and the owner of the second vehicle.

Yet another method has also been disclosed. The method generally includes activating, using a control unit, a first short range communication device; before, during, or after activating the first short range communication device, storing a first data set in a first memory; driving through a service lane with a vehicle; in response to driving through the service lane, retrieving the first data set from the first memory; transmitting, using the first short range communication device, the first data set via a first wireless signal; and receiving, using a second short range communication device, the first data set via the first wireless signal; wherein the control unit and the first short range communication device are each part of the vehicle; and wherein the second short range communication device is part of the service lane.

The foregoing method embodiment may include one or more of the following elements, either alone or in combination with one another:

In response to driving through the service lane, storing the first data set in a second memory; and after storing the first data set in the second memory, retrieving the first data set from the second memory Before, during, or after activating the first short range communication device, storing a second data set associated with the service lane in the second memory; and in response to driving through the service lane, retrieving the second data set from the second memory; transmitting, using the second short range communication device, the second data set via a second wireless signal; and receiving, using the first short range communication device, the second data set via the second wireless signal.

The second memory is part of the second short range communication device.

Activating, using the control unit, the first short range communication device includes receiving an input via an in-vehicle infotainment system associated with the vehicle.

The second short range communication device has a receiver antenna; the first short range communication device has a transmitter antenna; transmitting, using the first short range communication device, the first data set via the first wireless signal includes transmitting the first data set via the transmitter antenna of the first short range communication device; and receiving, using the second short range communication device, the first data set via the first wireless signal includes receiving the first data set via the receiver antenna of the second short range communication device.

The first data set includes payment information associated with an occupant of the vehicle.

Yet another system has also been disclosed. The system generally includes a service lane equipped with a first short range communication device; a vehicle adapted to drive through the service lane, wherein the vehicle is equipped with a control unit and a second short range communication device, and wherein the control unit is adapted to activate the second short range communication device; a first memory on which a first data set associated with the vehicle is stored; and a second memory; wherein, in response to the vehicle driving through the service lane when the second short range communication device is activated by the control unit, the first data set is adapted to be: retrieved from the first memory; transmitted, using the second short range communication device, via a first wireless signal; and received, using the first short range communication device, via the first wireless signal.

The foregoing system embodiment may include one or more of the following elements, either alone or in combination with one another:

In response to the vehicle driving through the service lane when the second short range communication device is activated by the control unit, the first data set is further adapted to be: stored in a second memory; and retrieved from the second memory after the first data set is stored in the second memory.

A second data set associated with the service lane is stored on the second memory; and, in response to the vehicle driving through the service lane when the second short range communication device is activated by the control unit, the second data set is adapted to be: retrieved from the second memory; transmitted, using the first short range communication device, via a second wireless signal; and received, using the second short range communication device, via the second wireless signal.

The second memory is part of the first short range communication device.

The second short range communication device is activatable, using the control unit, by receiving an input via an in-vehicle infotainment system associated with the vehicle.

The first short range communication device has a receiver antenna; the second short range communication device has a transmitter antenna; the first data set is transmittable via the transmitter antenna of the second short range communication device; and the first data set is receivable via the receiver antenna of the first short range communication device.

The first data set includes payment information associated with an occupant of the vehicle.

Yet another apparatus has also been disclosed. The apparatus generally includes one or more non-transitory computer readable mediums; and a plurality of instructions stored on the one or more non-transitory computer readable mediums and executable by one or more processors, the plurality of instructions including: instructions that, when executed, cause the one or more processors to store a first data set in a first memory before, during, or after activating a first short range communication device using a control unit, instructions that, when executed, cause the one or more processors, in response to driving through a service lane with a vehicle when the first short range communication device is activated by the control unit, to: retrieve the first data set from the first memory; transmit, using the first short range communication device, the first data set via a first wireless signal; and receive, using a second short range communication device, the first data set via the first wireless signal; wherein the control unit and the first short range communication device are each part of the vehicle; and wherein the second short range communication device is part of the service lane.

The foregoing apparatus embodiment may include one or more of the following elements, either alone or in combination with one another:

The plurality of instructions further include: instructions that, when executed, cause the one or more processors, in response to driving through the service lane with the vehicle when the first short range communication device is activated by the control unit, to: store the first data set in a second memory; and retrieving the first data set from the second memory after storing the first data set in the second memory.

The plurality of instructions further include: instructions that, when executed, cause the one or more processors to store a second data set associated with the service lane in the second memory before, during, or after the first short range communication device is activated by the control unit; and instructions that, when executed, cause the one or more processors, in response to driving through the service lane with the vehicle when the first short range communication device is activated by the control unit, to: retrieve the second data set from the second memory; transmit, using the second short range communication device, the second data set via a second wireless signal; and receive, using the first short range communication device, the second data set via the second wireless signal.

The second memory is part of the second short range communication device.

The second short range communication device is activatable, using the control unit, by receiving an input via an in-vehicle infotainment system associated with the vehicle.

The first data set includes payment information associated with an occupant of the vehicle.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method, comprising:
    detecting, using a sensor, an impact at a vehicle;
    before, during, or after detecting the impact, storing a first data set associated with the vehicle in a first memory;
    in response to detecting the impact,
        retrieving the first data set from the first memory;
        transmitting, using a first short range communication device, the first data set via a first wireless signal;
        receiving, using a second short range communication device, the first data set via the first wireless signal; and
        storing the first data set in a second memory; and
    after storing the first data set in the second memory, retrieving the first data set from the second memory;
    wherein the first short range communication device is an active near field communication ("NFC") device that is part of the vehicle;
    wherein the second short range communication device is a passive NFC device that includes a receiver antenna and is part of an infrastructure; and
    wherein the receiver antenna of the passive NFC device is used to receive the first data set via the first wireless signal.

2. The method of claim 1, wherein the infrastructure is a party to the impact.

3. The method of claim 1, further comprising:
    before, during, or after detecting the impact, storing a second data set associated with the infrastructure in the second memory; and
    in response to detecting the impact,
        retrieving the second data set from the second memory;
        transmitting, using the passive NFC device, the second data set via a second wireless signal; and
        receiving, using the active NFC device, the second data set via the second wireless signal.

4. The method of claim 1, wherein the second memory is part of the passive NFC device.

5. The method of claim 1, wherein the vehicle is equipped with the sensor; and
    wherein the sensor includes an airbag sensor, an antilock brake sensor, a camera, an accelerometer, a speedometer, a tachometer, a bumper impact sensor, a side impact sensor, or any combination thereof.

6. The method of claim 1, wherein transmitting, using the first short range communication device, the first data set via the first wireless signal comprises transmitting the first data set via a transmitter antenna of the active NFC device.

7. The method of claim 1, wherein the first data set includes at least one of:
    a vehicle identification number of the vehicle;
    an identification of the owner of the vehicle; or
    insurance information associated with the vehicle and the owner of the vehicle.

8. A system, comprising:
    a vehicle equipped with a first short range communication device;
    a sensor adapted to detect an impact at the vehicle;
    a first memory on which a first data set associated with the vehicle is stored;

an infrastructure equipped with a second short range communication device including a receiver antenna; and a second memory;

wherein the first short range communication device is an active near field communication ("NFC") device;

wherein the second short range communication device is a passive NFC device;

wherein, in response to the sensor detecting the impact, the first data set is adapted to be:
 retrieved from the first memory;
 transmitted via a first wireless signal using the active NFC device;
 received via the first wireless signal using the receiver antenna of the passive NFC device; and
 stored on the second memory;

and wherein, after the first data set is stored on the second memory, the first data set is retrievable from the second memory.

9. The system of claim 8, wherein the infrastructure is a party to the impact.

10. The system of claim 8, wherein a second data set associated with the infrastructure is stored on the second memory; and
 wherein, in response to the sensor detecting the impact, the second data set is adapted to be:
  retrieved from the second memory;
  transmitted via a second wireless signal using the passive NFC device; and
  received via the second wireless signal using the active NFC device.

11. The system of claim 8, wherein the second memory is part of the passive NFC device.

12. The system of claim 8, wherein the vehicle is equipped with the sensor; and
 wherein the sensor includes an airbag sensor, an antilock brake sensor, a camera, an accelerometer, a speedometer, a tachometer, a bumper impact sensor, a side impact sensor, or any combination thereof.

13. The system of claim 8,
 wherein the active NFC device has a transmitter antenna; and
 wherein the first data set is:
  transmittable using the transmitter antenna of the active NFC device.

14. The system of claim 8,
 wherein the first data set includes at least one of:
  a vehicle identification number of the vehicle;
  an identification of the owner of the vehicle; or
  insurance information associated with the vehicle and the owner of the vehicle.

15. A non-transitory computer readable medium having stored thereon instructions executable by one or more processors to cause a machine to perform operations comprising:
 detect, using a sensor, an impact at a vehicle;
 store a first data set associated with the vehicle in a first memory before, during, or after detecting the impact;
 retrieve the first data set from the first memory;
 transmit, using a first short range communication device of the vehicle, the first data set via a first wireless signal, wherein the first short range communication device is an active near field communication ("NFC") device;
 receive, using a receiver antenna of a second short range communication device of an infrastructure, the first data set via the first wireless signal, wherein the second short range communication device is a passive NFC device;
 store the first data set in a second memory; and
 after storing the first data set in the second memory, retrieve the first data set from the second memory.

16. The non-transitory computer readable medium of claim 15, wherein the infrastructure is a party to the impact.

17. The non-transitory computer readable medium of claim 15, further comprising operations:
 to store a second data set associated with the infrastructure in the second memory before, during, or after detecting the impact; and
 in response to detecting the impact, to:
  retrieve the second data set from the second memory;
  transmit, using the passive NFC device, the second data set via a second wireless signal; and
  receive, using the active NFC device, the second data set via the second wireless signal.

18. The non-transitory computer readable medium of claim 15, wherein the second memory is part of the passive NFC device.

19. The non-transitory computer readable medium of claim 15, wherein:
 the vehicle is equipped with the sensor; and
 the sensor includes an airbag sensor, an antilock brake sensor, a camera, an accelerometer, a speedometer, a tachometer, a bumper impact sensor, a side impact sensor, or any combination thereof.

20. The non-transitory computer readable medium of claim 15, wherein the first data set includes at least one of:
 a vehicle identification number of the vehicle;
 an identification of the owner of the vehicle; or
 insurance information associated with the vehicle and the owner of the vehicle.

* * * * *